UNITED STATES PATENT OFFICE.

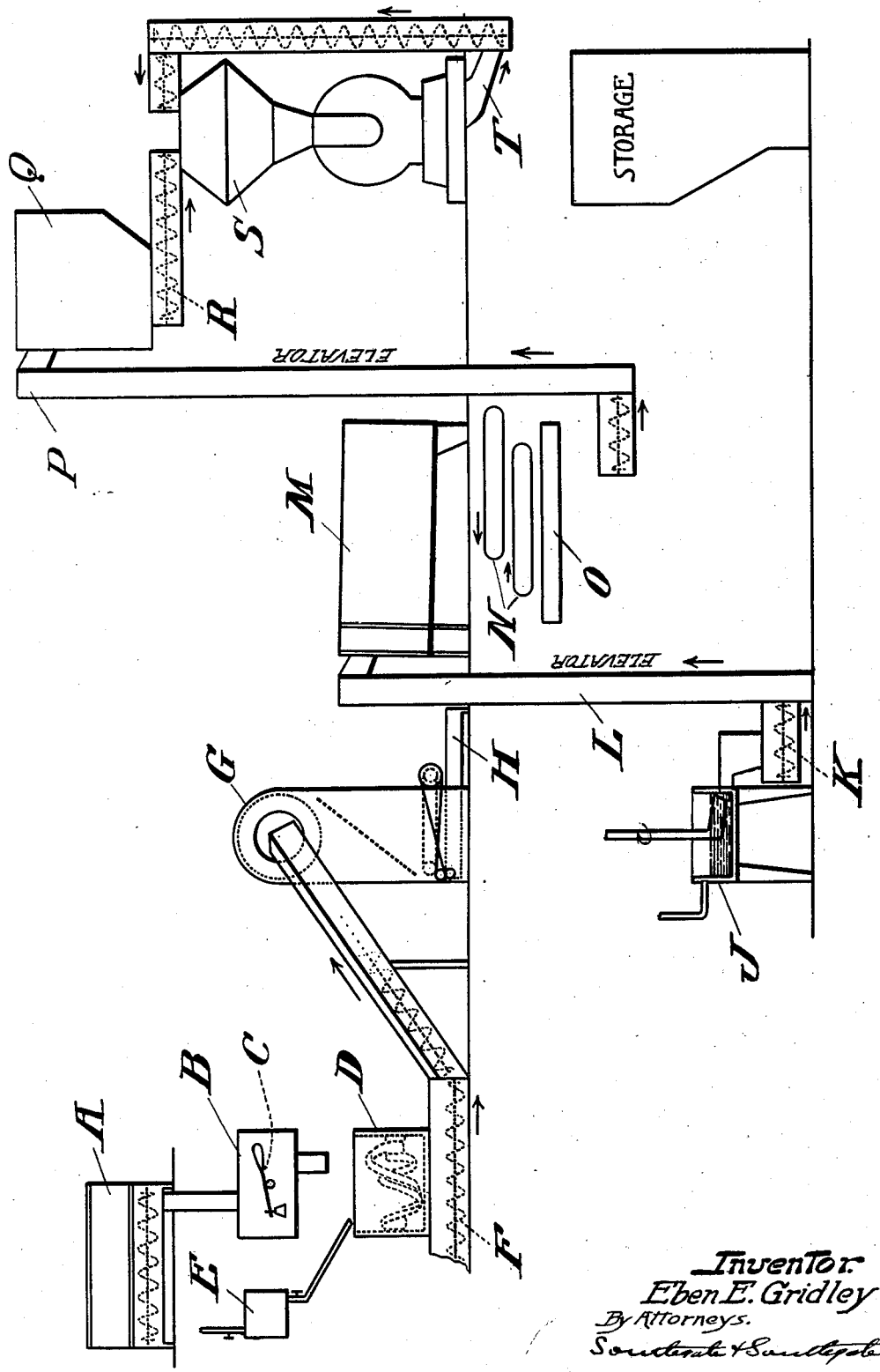

EBEN E. GRIDLEY, OF ORANGE, MASSACHUSETTS, ASSIGNOR TO MINUTE TAPIOCA COMPANY, OF ORANGE, MASSACHUSETTS, A CORPORATION OF MASSACHUSETTS.

METHOD OF PRODUCING AN ALIMENTARY SUBSTANCE AND PRODUCT THEREOF.

1,304,679.      Specification of Letters Patent.      Patented May 27, 1919.

Application filed October 15, 1917. Serial No. 196,608.

*To all whom it may concern:*

Be it known that I, EBEN E. GRIDLEY, a citizen of the United States, residing at Orange, in the county of Franklin and State of Massachusetts, have invented a new and useful Method of Producing an Alimentary Substance and Product Thereof, of which the following is a specification.

This invention relates to a method of producing a starch product for use as human food, and while not necessarily limited thereto relates more especially to the preparation of tapioca for such use.

The principal objects of the invention are to provide a procedure for preparing tapioca for a high class of food in such a manner that its manufacture all the way through will be definite and uniform, all of the old guesswork methods being avoided; to provide a procedure in which the material is subjected to a minimum of operations in order to secure the desired result, and in which these operations are of such a character that it need not be touched by the hands and can be kept from contamination of all kinds all the way through; also to simplify and render more efficient the usual preliminary steps and process of making tapioca and other starch products; and to provide a granular tapioca product in more convenient form for use in the household than has been the case heretofore. Further objects and advantages of the invention will appear hereinafter.

Reference is to be had to the accompanying drawing which is a diagrammatic view showing the steps through which the material passes in accordance with the preferred embodiment of this method.

Although I can use other forms of starch in accordance substantially with this method, it is particularly designed for preparing tapioca for use and will be so described.

The principal forms in which tapioca is put on the market are three, namely, the flour form, the flake form, and pearl tapioca. The flour is usually produced in the tropics where the tapioca plant grows by cutting up, washing, grating and settling the roots to produce a wet cake afterward separated by gravity and dried. This material is put on the market in this country for various purposes, but is not used, as far as I am aware, as a complete food product itself.

The pearl tapioca is a special form with which this invention is not especially concerned.

The flake tapioca is made in a similar way to the pearl tapioca, except that it is not reduced to globular form but is left in irregular flakes composed of small aggregations called crystals. In this case, the wet cakes from which tapioca flour could be made are broken up and partially cooked to produce the flaky mass which is the product sold as a food.

According to the method which is the subject of this invention the grated roots are used and if desired they can be sifted, settled with water, and separated by gravity, and the cakes thus dried to produce flour, but I prefer to put the grated roots through a pulp press to produce the flour, these steps being performed preferably in the country in which the roots are produced, and the flour itself shipped to the mill for the further steps, although that, of course, is not essential. However this flour is a convenient product to ship as it is perfectly dry and uniform, does not take up moisture from the air, and is not liable to deteriorate in shipping. It is also sufficiently pure so that no material amount of waste is shipped with it.

According to this process, this dry flour is introduced into a bolter A and bolted to reduce it to a fine flour-like condition. It is to be noted that this bolting operation is not for the purpose of removing impurities as the impurities, if any, are present in such a small degree as to be negligible. The bolted product, which is almost as fine as the finest grades of wheat flour, is conducted to a receptacle B on the platform of a set of scales C where measured quantities are separated and introduced into a dough mixer D. Measured quantities of water are also brought into a tank E and introduced into the mixer with flour. I find that the amount of water should be from forty to fifty per cent. by weight according to the condition and character of the particular flour used. I find it important to weigh both the flour and water carefully, after the proper proportions are ascertained by experiment, and to keep them constant. This mixer may be an ordinary dough mixer, such as used in bakeries. With the proportions of flour and water desired in this process it does not produce a sticky adhesive dough such as the ordinary dough produced in bakeries, but a crumbly mass. The particles of this could be made to adhere to each other by pressure but, not being subjected to that pressure, when it is dumped out of the dough mixer it is in such form that it can be conveyed by a screw conveyer F very readily and will not form large masses in that operation.

This conveyer takes it to a granulator G. The construction of this granulator need not be specified in detail, but it is sufficient to say that the material is introduced constantly by the screw conveyer and that a rotary screen inside receives it, aerates and separates the particles and discharges it down a chute in the form of small granules of irregular shape on a belt conveyer which discharges it into trays H.

It is carried in these trays either by mechanical means or by hand to a series of cookers J. These cookers are in the form of hollow cylindrical containers in which comparatively small quantities of the granular mass are placed and heated by steam in the walls and bottom of the cooker and maintained at a temperature of about 212 degrees Fahrenheit, that is, the boiling point at atmospheric pressure, for a period of from five to eight minutes. During this time it is thoroughly stirred by rotary stirrers so as to prevent any particles remaining in contact with the heated walls of the cooker for a great length of time. This stirring operation, of course, is kept up continuously during the cooking operation and when it is completed the contents of the cooker, now in a moist granular gelatin-like form, are discharged through a chute preferably on a screw conveyer K.

This takes the material to a bucket conveyer L which carries it up into a rotary drier M. This drier is in the form of a huge revolving cylinder, usually over thirty feet long provided with steam heated surfaces spaced apart inside and inclined so that the material, after rotating around the drier a plurality of times, will be discharged at the opposite end into a chute from which it is carried to a traveling series of belts N where it is subjected to currents of air and cooled. In this cooler the temperature is reduced preferably at least thirty-five degrees.

After the cooling operation any particles which have been in contact with the steam heated surfaces too long so as to be slightly browned are separated on an inspecting table O. Whether this inspection is performed by hand or automatically is immaterial as far as this method is concerned. The rest of the product is then taken by a system of overhead conveyers P and carried to storage bins Q where it is kept for a period of a couple of weeks, more or less, where its temperature gradually comes to the temperature of the surrounding atmosphere and the material assumes a uniform character. At the bottoms of these bins are screw conveyers R which take it to the crusher S which reduces the larger particles to a granular form and a substantially uniform size. It will be understood that much of the material is already of granular form, but it also contains particles of larger size. These are the parts that are crushed. The system at this point is preferably provided with a separator T which takes any large particles away from the main mass and diverts them back into the crusher through which they go again. From the crusher the material is taken to immense storage bins from which it is directed to an automatic filler and packaged.

This material is put on the market as a complete article of manufacture suitable for use in all places in which ordinary tapioca can be used, but obviously in a better form because finely granular, and also obviously constituting a uniform instead of a very irregular product. It is also entirely free from any over-cooked particles, from aggregations of starch crystals of large size and from hard globular lumps. The main object of crushing it is to remove and break up any lumps that would otherwise appear.

It will be seen therefore that this is not only a new product, although retaining all the best properties of the best edible tapioca, but that it is produced in a most sanitary manner and the procedure is such as to secure uniformly, cleanliness and freedom from all kinds of irregularities.

The cooking operation is performed for two purposes. First, to reduce the mass to a condition that is always the same and eliminate the usual irregularity of tapioca products; and second, to give it such a thorough preliminary cooking that in the final use of the material in the household it will have to be cooked only a short period of time. It also eliminates all danger of either animal or vegetable growth in the product and brings it into such condition that it can be stored for a long period of time without endangering it from these sources or getting it into such condition that it would readily absorb any material amount of moisture.

Although I have incidentally described certain features of the apparatus, I am aware of the fact that this process is not dependent upon any particular order in which the conveying operations are performed especially. Furthermore I do not wish to be limited to the use of tapioca alone or to other details of procedure except as specified in the claims, but what I do claim is—

1. The method of making a partially cooked tapioca product which comprises taking a dry tapioca flour, mixing it with water enough to form a dough of crumbly consistency, cooking and simultaneously stirring the dough so as to leave a moist gelatin-like product, and then drying and cooling the same.

2. The method of making a partially cooked starch food product comprising bolting a dry starch flour, mixing it with a predetermined proportion of water to form a dough of crumbly consistency, sifting it immediately and mechanically reducing the dough to a granular condition, cooking and simultaneously stirring but discontinuing the cooking operation while the material retains a moist condition, drying it, cooling it, storing the product for a comparatively long period of time, and then crushing to reduce it to uniform condition.

3. The method of making a partially cooked tapioca food product comprising bolting a dry tapioca flour, mixing it with a predetermined proportion of water to form a dough of crumbly consistency, mechanically reducing the dough to a granular condition, cooking and simultaneously stirring but discontinuing the cooking operation while the material retains a moist condition.

4. The method of making a tapioca food product which consists in bolting tapioca flour, mixing it with from forty to fifty per cent. by weight of water to produce a dough of crumbly consistency, cooking it by steam heat, thoroughly stirring it throughout the entire cooking operation, discontinuing the cooking operation while the dough is still in a moist condition, drying, cooling and crushing.

5. The method of making a tapioca food product which consists in subjecting washed, grated and sifted tapioca roots to the action of a pulp press to produce flour, mixing the tapioca flour, with from forty to fifty per cent. by weight of water to produce a dough of crumbly consistency, granulating the dough, and cooking it by steam heat at a temperature of about 212 degrees Fahrenheit, thoroughly stirring it throughout the entire cooking operation, discontinuing the cooking operation while the dough is still in a gelatin-like moist condition, drying, cooling and crushing.

In testimony whereof I have hereunto affixed my signature.

EBEN E. GRIDLEY.